United States Patent [19]
Donnelly et al.

[11] Patent Number: 5,503,860
[45] Date of Patent: Apr. 2, 1996

[54] PROCESS OF FORMING DOUGH ON A CORRUGATED PAPERBOARD PREFORM

[75] Inventors: Davis A. Donnelly, Eau Claire; Larry I. Kufahl, Wausau; Harry K. Kralkow, Eau Claire, all of Wis.

[73] Assignee: Dadco, Inc., Eau Claire, Wis.

[21] Appl. No.: 268,998

[22] Filed: Jun. 30, 1994

[51] Int. Cl.$^6$ .................................. A21C 11/00
[52] U.S. Cl. ................ 426/420; 426/132; 426/389; 426/391; 426/414; 426/496; 426/512; 425/127
[58] Field of Search .................. 426/94, 128, 132, 426/389, 391, 420, 414, 496, 512, 502; 425/112, 127

[56] References Cited

U.S. PATENT DOCUMENTS

| | | | |
|---|---|---|---|
| 787,274 | 4/1905 | Burns | 426/502 |
| 2,407,118 | 9/1946 | Waters | 93/49 |
| 2,757,093 | 7/1956 | Starzyk | 426/414 |
| 2,774,316 | 12/1956 | Daino | 426/391 |
| 2,975,741 | 3/1961 | Ruffino | D7/672 X |
| 3,190,758 | 6/1965 | Hauf | 426/391 |
| 3,202,114 | 8/1965 | Cameron et al. | 426/391 |
| 3,934,308 | 1/1976 | Neri | 17/32 |
| 3,958,910 | 5/1976 | Wilde | 425/127 |
| 4,176,591 | 12/1979 | Power | 99/430 |
| 4,184,421 | 1/1980 | Ahlgren | 99/450 |
| 4,251,549 | 2/1981 | Fournet et al. | 426/391 X |
| 4,271,200 | 6/1981 | Hempenius et al. | 426/496 X |
| 4,303,677 | 12/1981 | De Acetis | 426/94 X |
| 4,337,116 | 6/1982 | Foster et al. | 162/158 |
| 4,367,243 | 1/1983 | Brummett et al. | 426/391 X |
| 4,376,243 | 3/1983 | Renn et al. | 219/514 |
| 4,462,497 | 7/1984 | Lifshitz | 425/510 |
| 4,464,405 | 8/1984 | DeChristopher | 426/512 X |
| 4,511,324 | 4/1985 | Bauer | 425/398 |
| 4,539,213 | 9/1985 | Cherkasky et al. | 426/512 |
| 4,563,946 | 1/1986 | Barlow et al. | 99/450 |
| 4,634,365 | 1/1987 | Triporo et al. | 425/398 |
| 4,644,858 | 2/1987 | Liotto et al. | 99/449 |
| 4,676,151 | 6/1987 | Gorsuch et al. | 99/450 |
| 4,696,823 | 9/1987 | DeChristopher | 426/94 X |
| 4,785,968 | 11/1988 | Logan et al. | 220/410 |
| 4,911,634 | 3/1990 | Keener | 425/412 |
| 4,973,240 | 11/1990 | Reilly | 425/195 |
| 5,074,778 | 12/1991 | Betts, Jr. et al. | 425/394 |
| 5,139,405 | 8/1992 | Krone et al. | 425/116 |
| 5,176,922 | 1/1993 | Balsano et al. | 426/811 X |
| 5,204,125 | 4/1993 | Larsen | 426/496 X |

*Primary Examiner*—Donald E. Czaja
*Assistant Examiner*—Milton I. Cano
*Attorney, Agent, or Firm*—Lathrop & Clark

[57] ABSTRACT

Proofed dough is formed into pizza crusts which are formed and frozen without baking. The dough is positioned on corrugated paperboard preforms within a tray having multiple circular openings. The preforms have sidewardly opening corrugations. The trays are conveyed through the forming apparatus in a continuous process, with formed crusts being removed and fresh preforms being inserted. The preforms are positioned in a rectangular array within the openings in the conveyed tray. A quantity of raw dough is positioned on each preform within the tray. The dough is conveyed on the preforms beneath a bank of high pressure forming dies. The dies are pressed into the openings within the tray and over the dough to form the dough into the desired pizza crust shape. Each die extends between the preform and the tray within the opening to force portions of the dough into the preform corrugations to thereby secure the formed dough to the preform. The dough which extends into the corrugations locks the crust in place, retaining the desired shape until the dough is processed on the preform through a freezer. The crust is never subjected to baking, and thus the yeast within the dough is not killed prior to being supplied to the baker, resulting in a frozen pizza or pizza crust which has substantial attributes of a fresh pizza. Backing sheets with holes may be formed to the crust for oven rack baking. Bread sticks, rolls, and other formed bread products may also be formed.

7 Claims, 6 Drawing Sheets

PROCESS OF FORMING DOUGH ON A CORRUGATED PAPERBOARD PREFORM

FIELD OF THE INVENTION

The present invention relates to dough baked goods in general, and to preformed dough foodstuffs crusts prepared for cooking and consumption at a later time in particular.

BACKGROUND OF THE INVENTION

Freshly baked bread products have long been enjoyed by home consumers and restaurant patrons. Preparing pastries and bread products such as pizza crusts and rolls, however, requires ready supplies of perishable materials, skill, and most importantly, time. To minimize meal preparation times, home consumers have a need for preformed, frozen dough products which may be placed in the consumer's home oven and baked for consumption. Likewise, to reduce labor costs and order preparation times, restaurants and pizzerias have a need for preformed bread products, in particular pizza crusts, which will allow the rapid preparation of meals to order.

Pizza crusts have typically been supplied to pizzerias as preformed frozen crusts, with the cheese and other toppings being added to the crust at the time of baking. Pizza crusts of this sort were typically formed in a die-stamping process, baked within a retaining ring or platen, and then packaged. By partially or completely baking the product prior to removal from the baking pan the desired molded shape was preserved. A drawback of prebaked bread products is that the final article is twice-baked and does not retain the moist rich texture and taste of a freshly-baked product.

An attempt to preserve at least a semblance of freshness has been made by providing pizza crusts with a central portion which is unbaked and frozen. The unbaked preformed central portion when baked will rise a certain amount, and provides an improved texture and taste, although still short of that of a freshly baked dough.

Heretofore preformed bread dough products have been limited to those at least partially baked due to the difficulty of manipulating a raw dough product without destroying its shape. What is needed is a preformed pastry product such as a pizza crust which may be shaped to a desired shape and delivered in frozen form to an end user without ever being subjected to baking.

SUMMARY OF THE INVENTION

The bread products and pizza crusts of the present invention are formed of proofed dough which is molded to a desired shape and frozen on a corrugated paperboard preform without being subjected to baking, allowing a frozen bread product to be formed in which the yeast has not been killed. In forming pizza crusts, the proofed dough is positioned on corrugated paperboard preforms within a tray having multiple circular openings. The preforms have sidewardly opening corrugations. The trays are conveyed through the forming apparatus in a continuous process, with formed crusts being removed and fresh preforms being inserted. The preforms are positioned in a rectangular array within the openings in the conveyed tray. A quantity of raw dough is positioned on each preform within the tray. The doughs are preferably deposited as balls, which may be flattened before the molding step. The dough is conveyed on the preforms beneath a bank of high pressure forming dies. The dies are pressed into the openings within the tray and over the dough to form the dough into the desired pizza crust shape. Each die extends between the preform and the tray within the opening to force portions of the dough into the preform corrugations to thereby secure the formed dough to the preform. The dough which extends into the corrugations locks the crust in place, retaining the desired shape until the dough is processed on the preform through a freezer. The crust is never subjected to baking, and thus the yeast within the dough is not killed prior to being supplied to the baker, resulting in a frozen pizza or pizza crust which has substantial attributes of a fresh pizza. Bread sticks, rolls, and other formed bread products may also be formed. To prevent deformation of the baking crust on the bars of an oven rack an oven-safe paper sheet may be molded into the crust between the crust and the preform.

It is an object of the present invention to provide a transportable formed and frozen pizza crust which has never been subjected to baking.

It is also an object of the present invention to provide a process for forming bread products for delayed baking and consumption which will rise when baked and retain attributes of fresh proofed dough.

It is another object of the present invention to provide a process for forming bread products which conserves the consumption of energy in the production thereof.

It is a further object of the present invention to provide a process for forming bread products which maintains the desired shape of the product without baking.

It is yet another object of the present invention to provide a formed bread product for delayed baking and consumption which rises when baked and retains attributes of fresh proofed dough.

Further objects, features and advantages of the invention will be apparent from the following detailed description when taken in conjunction with the accompanying drawings.

DESCRIPTION OF THE PREFERRED EMBODIMENTS

Figure 1:
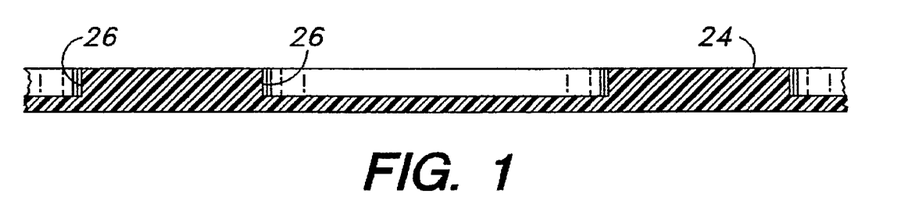
FIG. 1 is a cross-sectional view of a pizza crust tray.
Figure 6:
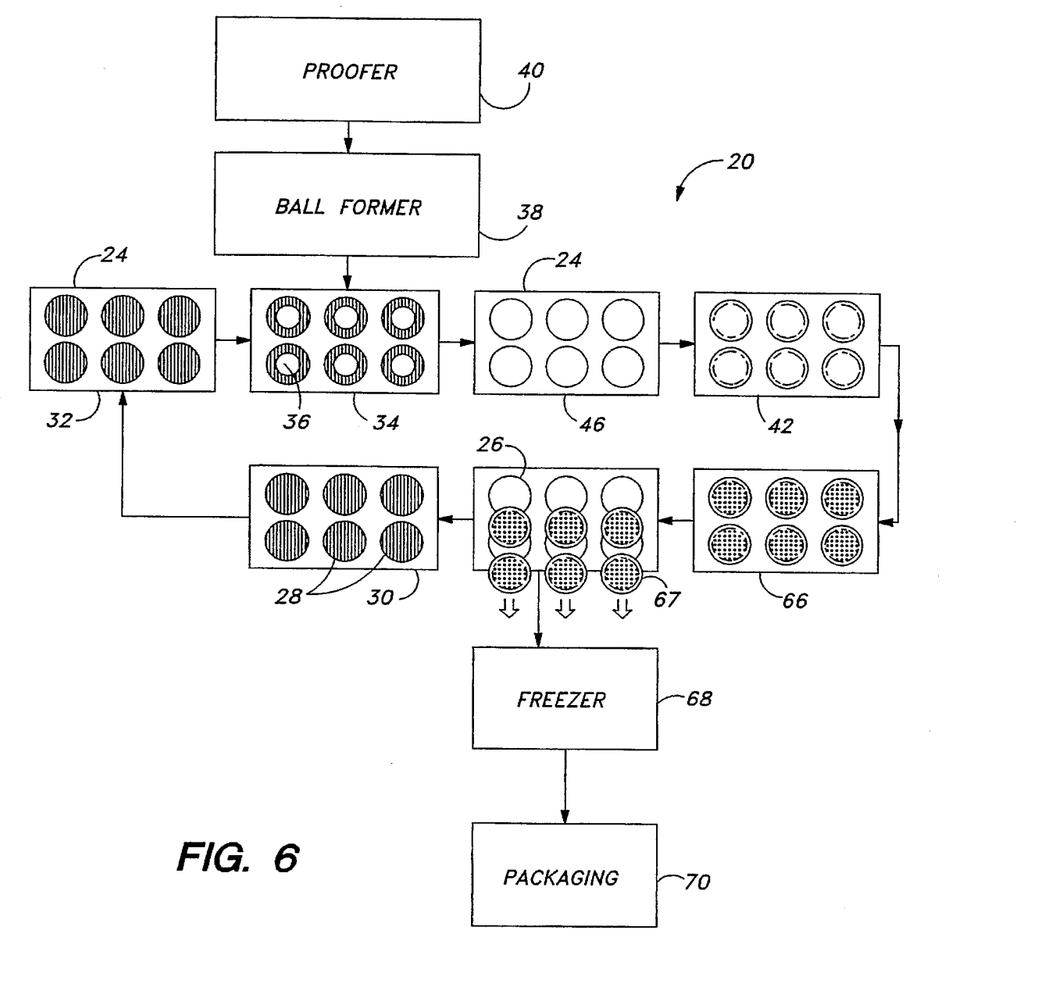
FIG. 6 is a flow chart illustrating the dough forming process of this invention.
Figure 7:
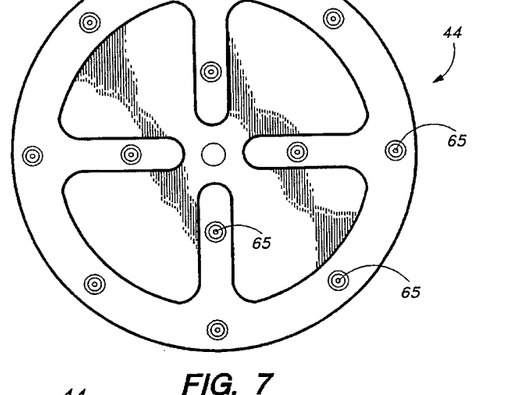
FIG. 7 is a top plan view of the dough-forming die of FIG. 4.

Referring more particularly to FIGS. 1–13, wherein like numbers refer to similar parts, a pizza crust forming apparatus 20 is shown schematically in FIG. 6. Pizza crusts 22 are formed in trays 24, which may be conveyed around a looped path by conventional means, such as hydraulic or pneumatically actuated pusher arms. Each tray 24, as shown in FIG. 1, has an array of circular openings 26 which accept corrugated paperboard preforms 28 therein. The openings 26 are blind holes which am formed in the tray 24, and allow an array of preforms 28 to be conveyed simultaneously. The trays 24 are preferably formed of plastic such as Teflon or other low friction material. The pusher arms are actuated intermittently to advance the trays 24 in steps, with pauses between tray motions for operation of the apparatus on the preforms 28 and dough deposited thereon.

Figure 2:
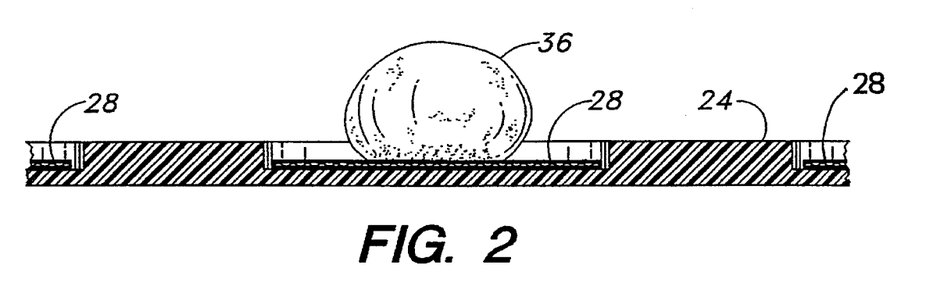
FIG. 2 is a cross-sectional view of the tray of FIG. 1 loaded with corrugated paperboard preforms onto which balls of dough have been placed.

As shown in FIG. 6, circular corrugated preforms 28 are loaded into the trays 24 at a loading station 30. The preforms 28 may be manually set in position, or may be dropped into place by an automatic dispenser. From the loading station 30, the trays 24 are conveyed to a spray station 32 where a vegetable oil is sprayed on to the preforms 28 to facilitate later release of the crust 22 from the preform 28. The trays 24 pass from the spray station 32 to a dough deposit station 34, where balls of proofed dough 36 are dropped onto the preforms 28, as shown in FIG. 2. The balls 36 are supplied from a ball former 38 which receives proofed dough from the proofer 40. The ball former 38 and proofer 40 are conventional and well known in the art.

Figure 3:
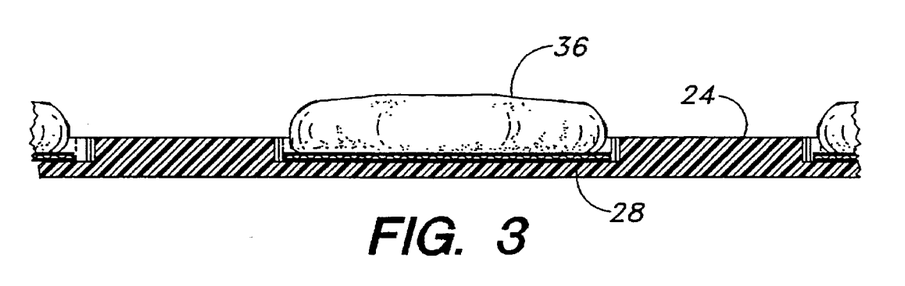
FIG. 3 is a cross-sectional view of the tray of FIG. 2 after the dough balls have been flattened.

The trays 24 may move directly from the dough deposit station 34 to a molding station 42. However, to reduce the travel of the dies 44, the trays 24 preferably pass first through a flattening station 46, where flat plastic blocks reduce the height of the balls of dough 36 by flattening them onto the preforms 28, as shown in FIG. 3.

Figure 4:
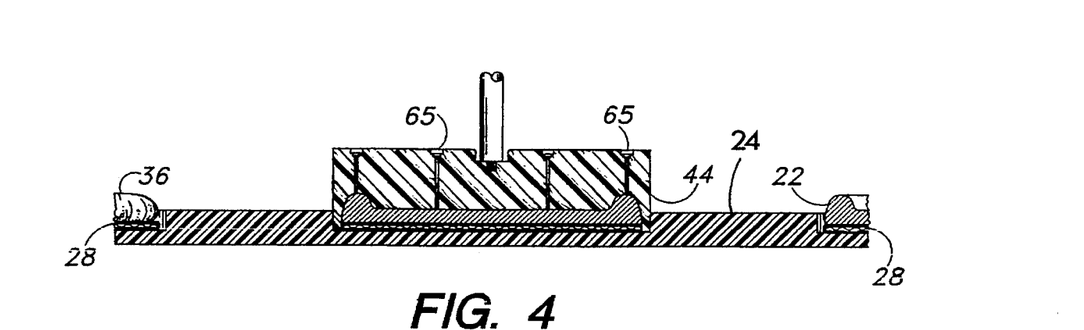
FIG. 4 is a cross-sectional view of the tray of FIG. 3 positioned beneath a plurality of high pressure dough-forming dies.
Figure 5:
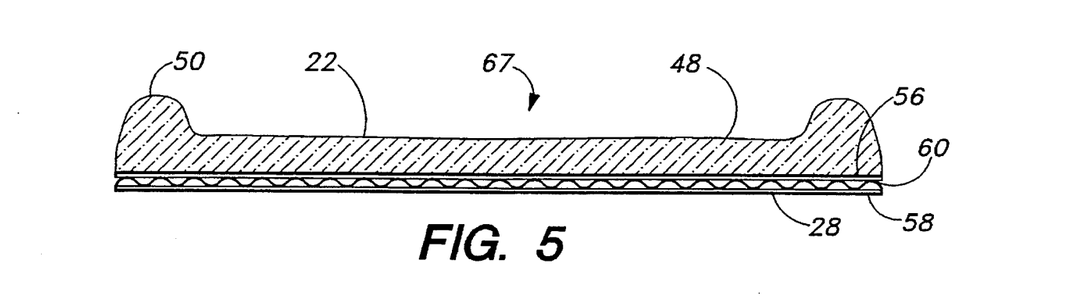
FIG. 5 is a cross-sectional view of the pizza crust and preform of FIG. 4 which has been frozen for shipping and storage prior to baking.
Figure 8:
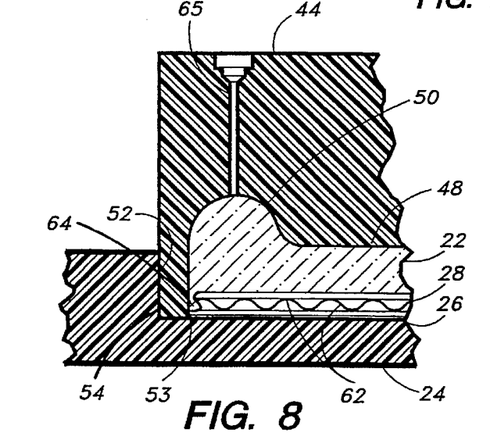
FIG. 8 is a fragmentary cross-sectional view of the dough being forming on the corrugated preform, showing an air-injection hole for facilitating dough release.

As shown in FIG. 4, at the molding station 42, plastic dies 44, mounted on reciprocating hydraulic actuators, move vertically to engage within the openings 26 and to press against the dough ball 36 and form it at pressures in the range of from about 2,500 psi to about 3,200 psi into a desired molded shape. A preferred pressure is about 2,900 psi. As shown in FIG. 8, typically the molded shape will be a flat circular pizza center 48 with an upwardly extending peripheral pizza rim 50. In a preferred embodiment, the preforms 28 are smaller in diameter than the openings 26, to allow a die 44 to extend into the opening between the vertical cylindrical sidewall 52 of the opening 26 and the circular preform 28. A horizontal gap 53 is defined between the downwardly extending lip 54 of the die 44 and the preform 28. The preform 28 is preferably a die-cut corrugated paperboard or cardboard circle. As shown in FIG. 8, the preform 28 is comprised of a top layer of paperboard 56, a bottom layer of paperboard 58, and a central corrugated layer of paperboard 60. The corrugated layer 60 is bent in a generally sinusoidal configuration, and glued to the top and bottom layers 56, 58, to define a plurality of parallel corrugations 62 which open sidewardly from the preform 28. The corrugations 62 provide bulk and stiffness to the preform 28 with reduced weight. However, the process of this invention additionally utilizes the corrugations 62 to secure the dough formed in the die 44 to the preform 28 so that it will retain its desired molded shape once the elevated pressures within the die have been relieved.

Dough typically has elastic properties, and will have a tendency to retract away from the edges of the preform 28. The portions 64 of the dough which are pressed under the high pressure of the molding step into the corrugations 62 retain the pizza rim 50 at the perimeter of the preform 28. The engagement of the dough portions 64 with the sidewardly opening corrugations counteracts the tendency of the dough to retract, and ensures that the desired dough molded shape is maintained until the dough can be frozen.

Once the dough has been molded into a pizza crust 22 air is injected through channels 65 above the pizza rim 50 and the pizza center 48 to facilitate release of the crust 22 from the die 44. The molded crusts 22 are conveyed in the tray 24 from the molding station 42 to a docking station 66 where metal dies form an array of narrow diameter depressions in the formed crust 22. This docking is conventional in the baking industry and facilitates better and more consistent baking and rising.

In a preferred embodiment the trays 24 have an array of four pin holes (not shown) which extend beneath the openings 26 through which ejection pins extend to elevate the cardboard preforms and the raw crusts secured thereto out of the trays. The elevated preform-crust assemblies 67, shown in FIG. 5, may then be manually placed on a cart or rack for transfer to a freezer 68, or they may be transferred to a separate conveyer which leads to a freezer. The crusts 22 may be filled with pizza ingredients prior to entering the freezer if the crusts are intended for purchase by an end consumer, or may be left untilled if the crusts are intended for pizzeria use.

From the freezer 68 the pizzas are packaged at a packaging station 70, typically by being wrapped in plastic and stacked in boxes for freezer car shipment to the purchaser.

It is important to note that at no time is the crust 22 baked in full or in part. Because the dough is secured to the cardboard preform, it will retain its desired shape as it is conveyed from the molding station to the freezer. By avoiding any baking the flavor and texture of the fresh dough is preserved. In addition, a substantial savings in heating and cooling costs is realized. First, the energy required to bake the molded dough prior to freezing is saved, and second, the energy required to cool down the baked dough is also conserved. Not only is the expense of the added heating and cooling saved, but also the capital expenditures for an oven and a more powerful freezer are eliminated. In short, the process of this invention allows not only an improved dough product, but allows that product to be produced at reduced cost.

When it is desired to prepare the crust 22 for consumption, the frozen crust-cardboard-preform assembly is removed from the freezer, and the preform is separated from the crust. The frozen crust is placed in an oven and baked in a conventional manner. Because the proofed dough has been frozen without any baking, the yeast within the dough has never been subjected to elevated temperatures which would kill the yeast. Hence, in the baking process the dough will raise a certain amount before being fully baked. The result is a crust which maintains many of the properties of a freshly baked crust, while offering the convenience and transportability of a frozen crust.

Figure 13:
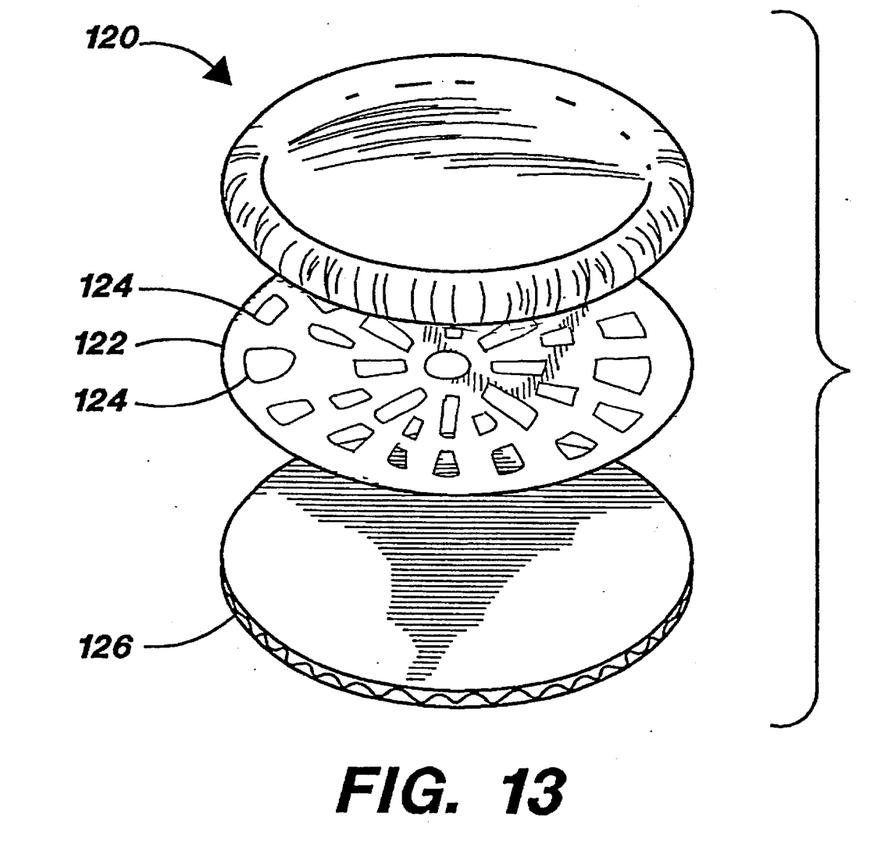
FIG. 13 is an exploded isometric view of the sheet which is positioned between the preform and crust and molded into the crust for support of the baking pizza on an oven rack.

To facilitate baking of the crust or other dough product of this invention in an oven having racks formed or aligned bars, a crust 120 may be formed over an oven-safe paper sheet 122 as shown in FIG. 13. The paper sheet 122 is of a conventional oven-safe paper, such as is commonly used with microwaved food products. The sheet is formed with a plurality of die-cut holes 124 and is formed with the crust in the molding process as described above with the single modification of inserting the die-cut sheet on the preform 126 prior to pressing the dough into shape. The sheet 122 is smaller in diameter than the preform 126 and hence does not interfere with the locking of the dough to the preform. The paper sheet 122 is thus formed with the crust 120, and the dough of the crust extends through the holes 124 to the preform 126 and locks the sheet 122 to the dough. The end user may thus remove the frozen crust 120 together with the sheet 122 from the preform 126 and place the assembly on an oven rack for baking. As the dough thaws the crust will loose its stiffness. The sheet 122, however, will prevent the more pliable crust from distending through the oven rack before the dough has become baked and rigid. The sheet 122 forms a backing which restrains flow of the dough, while at the same time the holes 124 permit the escape of gases from the bottom of the crust and ensure uniform baking. The finished baked crust may be removed from the oven with the sheet 122 attached thereto, and the crust may be served directly from the sheet. It should be noted that although a pattern of radial slots has been illustrated, alternative patterns of slot, holes, and other shapes may also be used.

Figure 9:
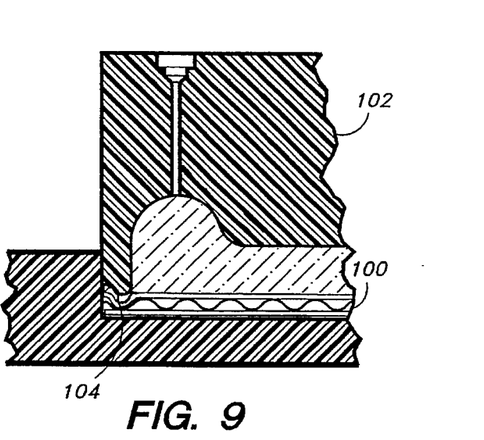
FIG. 9 is a fragmentary cross-sectional view on alternative embodiment dough-forming die and preform with dough formed thereon of this invention.

An alternative embodiment of the process of this invention employs a preform 100 which is nearly the same diameter as the opening 26 and a molding die 102 at the molding station which has a downwardly protruding rib 104. The rib 104, shown in FIG. 9, is positioned above the preform 100 so that when the die 102 is pressed down into the opening, dough is distributed beneath the rib and is pressed into the preform by the rib. The fib 104 dimples the corrugated preform 100 and locks the dough in place to hold the desired molded shape during transport and freezing of the dough as described above.

Figure 10:
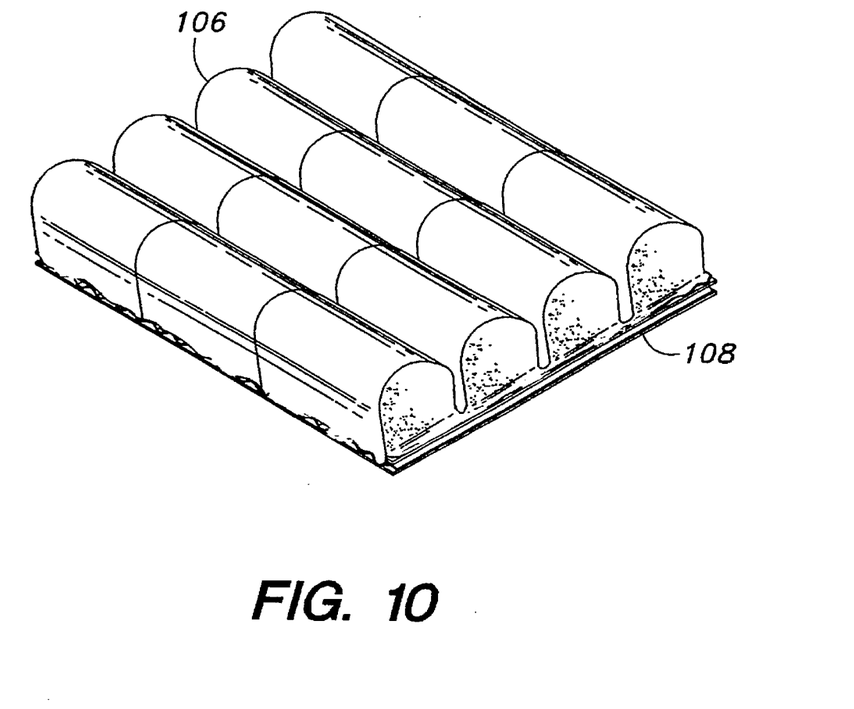
FIG. 10 is an isometric view of an alternative dough product formed in the process of this invention.

It should be noted that, although pizza crusts with raised rims have been illustrated as the dough product produced in the processes of this invention, other types of bread products may also be prepared for freezing. Rolls or buns 106, as shown in FIG. 10, may be molded on a rectangular preform 108. Portions of the dough extend into the exposed corrugations of the preform 108 and lock the molded dough in place.

Figure 11:
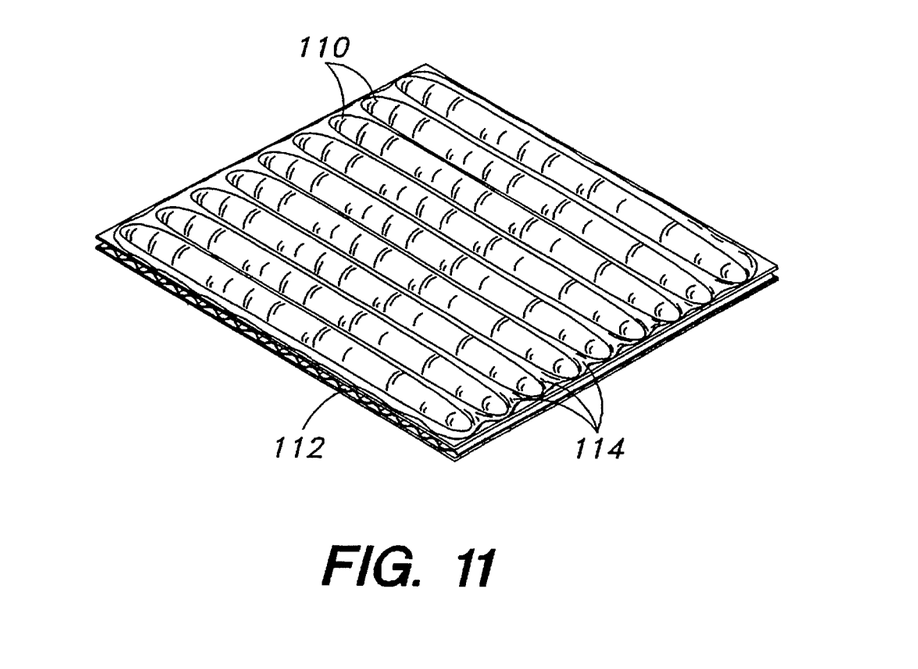
FIG. 11 is an isometric view of another alternative dough product formed in the process of this invention.

As another example, bread sticks 110, shown in FIG. 11, may be formed using the process illustrated in FIG. 9 which employs a die with a rib which depresses portions of the dough into a depression in the preform 112 surrounding the bread product. The bread sticks 110 may be formed on the preform and frozen. Preferably the bread sticks are formed as a single molded shape, with individual sticks joined by a narrow, reduced height, bridge 114 of dough. When it is desired to prepare an individual bread stick, one may be separated from the group by breaking it off along the bridge, and placing it in an oven for baking.

Figure 12:
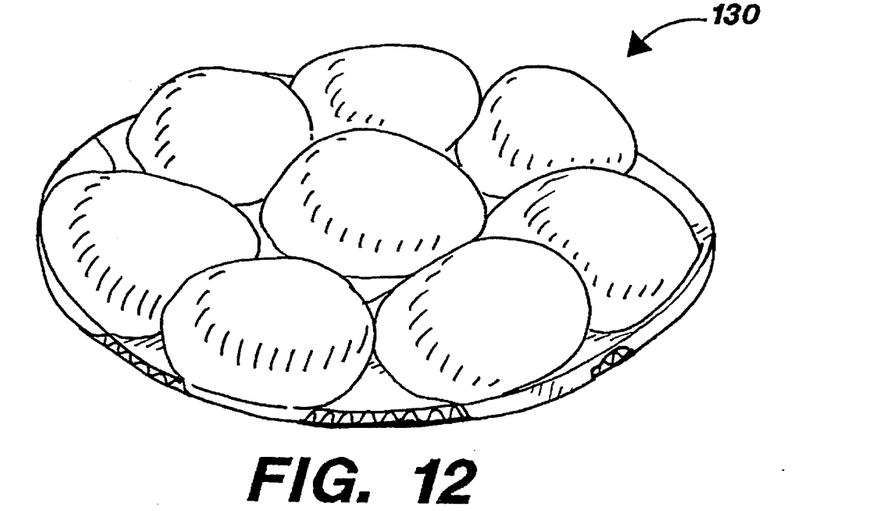
FIG. 12 is a perspective view of another alternative dough product formed in the process of this invention.

Another dough product is shown in FIG. 12. Generally circular rolls 130 may be formed on a circular preform, and may be separated after baking.

It should be noted that bread products and other raised dough products may be formed in the process of this invention using a wide variety of ingredients and dough recipes. Furthermore, preforms of various thickness and shape may be employed, including single and double corrugated paperboard.

It is understood that the invention is not limited to the particular embodiments disclosed and illustrated herein, but embraces such modified forms thereof as come within the scope of the following claims.

We claim:

1. A process for forming dough on a corrugated paperboard preform having a plurality of sidewardly opening corrugations the process comprising the steps of:
   a) positioning a corrugated preform having sidewardly opening corrugations within a hole defined within a tray supported on a conveyor;
   b) placing a quantity of raw dough on the preform;
   c) positioning the dough on the preform beneath a die;
   d) pressing the die over the dough to form the dough into a desired shape and wherein the tray cooperates with said die to force portions of the dough sidewardly into the sidewardly opening corrugations of the preform to thereby secure the formed dough to the preform; and
   e) freezing the formed dough on the preform without baking the dough.

2. A preformed raw dough assembly, comprising:
   a) a corrugated paperboard preform having a plurality of sidewardly opening corrugations;
   b) a quantity of raw dough positioned on the preform and formed thereon into a desired shape, wherein portions of the dough extend into the plurality of sidewardly opening corrugations to secure the dough in the desired shape to the preform.

3. A process for forming dough on a corrugated paperboard preform the process comprising the steps of:
   a) positioning a corrugated preform on a conveyor within a hole defined within a tray supported on said conveyor;
   b) placing a quantity of raw dough on the preform;
   c) positioning the dough on the preform beneath a die;
   d) pressing the die over the dough to form the dough into a desired shape and to deform portions of the preform downwardly to define a dimple in said corrugated paperboard preform which substantially surrounds the desired shape, and the dough being depressed into said dimple, the dough being thereby secured to the preform; and
   e) freezing the formed dough on the preform without baking the dough.

4. The process of claim 3 wherein the preform is substantially circular, and the dough is formed by the die into a pizza crust with an upwardly extending pin.

5. A process for forming a plurality of pizza crusts on corrugated paperboard preforms having a plurality of sidewardly opening corrugations the process comprising the steps of:
   a) positioning corrugated preforms having a plurality of sidewardly opening corrugations within openings in a conveyed tray;
   b) placing a quantity of raw dough on each preform within the tray;
   c) positioning the dough on the preform beneath at least one die;
   d) pressing a die into the opening within the tray and over the dough to form the dough into a desired shape, wherein the die extends between the preform and the tray within the opening to force portions of the dough sidewardly into the preform corrugations, the die cooperating with the tray to thereby secure the formed dough to the preform; and e) freezing the formed dough on the preforms without baking the dough.

6. The process of claim 5 further comprising the step of removing the dough on the preforms from the tray prior to the freezing step.

7. A process for forming dough on a paperboard preform, the process comprising the steps of:

a) positioning a paperboard preform having a peripheral edge within an opening on a tray, wherein the opening is larger than the preform;

b) placing a quantity of raw dough on the preform;

c) positioning the dough on the preform within the tray opening beneath a die;

d) pressing the die over the dough and around the preform to form the dough into a desired shape and to force portions of the dough into the tray opening to surround the preform peripheral edge and to thereby secure the formed dough to the preform; and e) freezing the formed dough on the preform without baking the dough.

* * * * *